United States Patent
Ameigeiras et al.

(10) Patent No.: US 7,512,099 B2
(45) Date of Patent: Mar. 31, 2009

(54) METHOD, SYSTEM AND TRANSMITTING SIDE PROTOCOL ENTITY FOR SENDING PACKET DATA UNITS FOR UNACKNOWLEDGED MODE SERVICES

(75) Inventors: Pablo Ameigeiras, Malaga (ES); Jeroen Wigard, Aalborg (DK)

(73) Assignee: Nokia Siemens Networks Oy, Espoo (FI)

( * ) Notice: Subject to any disclaimer, the term of this patent is extended or adjusted under 35 U.S.C. 154(b) by 772 days.

(21) Appl. No.: 10/771,547

(22) Filed: Feb. 5, 2004

(65) Prior Publication Data
US 2005/0138528 A1    Jun. 23, 2005

(30) Foreign Application Priority Data
Dec. 5, 2003   (FI)   .................. 20031779

(51) Int. Cl.
*H04Q 7/00*   (2006.01)
*H04L 12/66*  (2006.01)
*H04L 12/28*  (2006.01)

(52) U.S. Cl. ................. 370/331; 370/352; 370/412

(58) Field of Classification Search ................ 370/331, 370/352–356, 395.1, 412–419; 455/436–439, 455/442, 443; 340/502, 7.22, 298
See application file for complete search history.

(56) References Cited

U.S. PATENT DOCUMENTS 6,813,256 B1 * 11/2004 Nevo et al. ................. 370/335
6,987,780 B2 * 1/2006 Wei et al. .................... 370/469
7,356,146 B2 * 4/2008 Yi et al. ....................... 380/262

FOREIGN PATENT DOCUMENTS

| EP | 0891114 | 1/1999 |
| EP | 1128704 | 8/2001 |
| GB | 2396998 | 7/2004 |

OTHER PUBLICATIONS

International Search Report for International Application No. PCT/FI 2004/000700, date unknown.

* cited by examiner

*Primary Examiner*—Eugene Yun
(74) *Attorney, Agent, or Firm*—Squire, Sanders & Dempsey L.L.P.

(57) ABSTRACT

A method, system and transmitting side protocol entity is disclosed for sending packet data units for unacknowledged mode services in a mobile communication network. A retransmission parameter is set to a desired value in order to prevent retransmission of packet data units in a handover situation. The transmitting side acknowledged mode radio link control entity purges from the retransmission buffer based on status reports from a user equipment. The packet data units that have been acknowledged by user equipment. A status report includes the sequence number of the highest packet data unit expected by the user equipment, and therefore the status report indicates the sequence number of the radio link control packet data units that have been received at the user equipment (either correctly or incorrectly). All the remaining packet data units in the retransmission buffer are scheduled for transmission and transmitted to the new node.

10 Claims, 2 Drawing Sheets

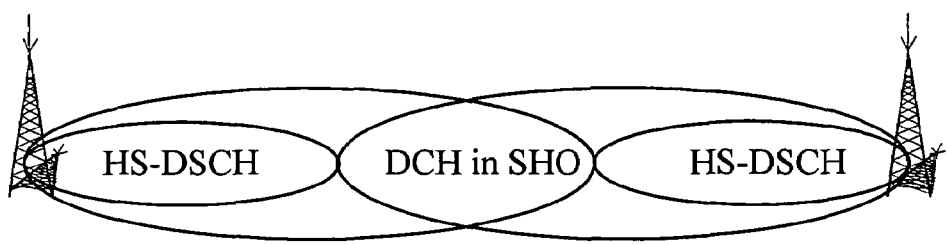
Fig. 1 (Pior art)
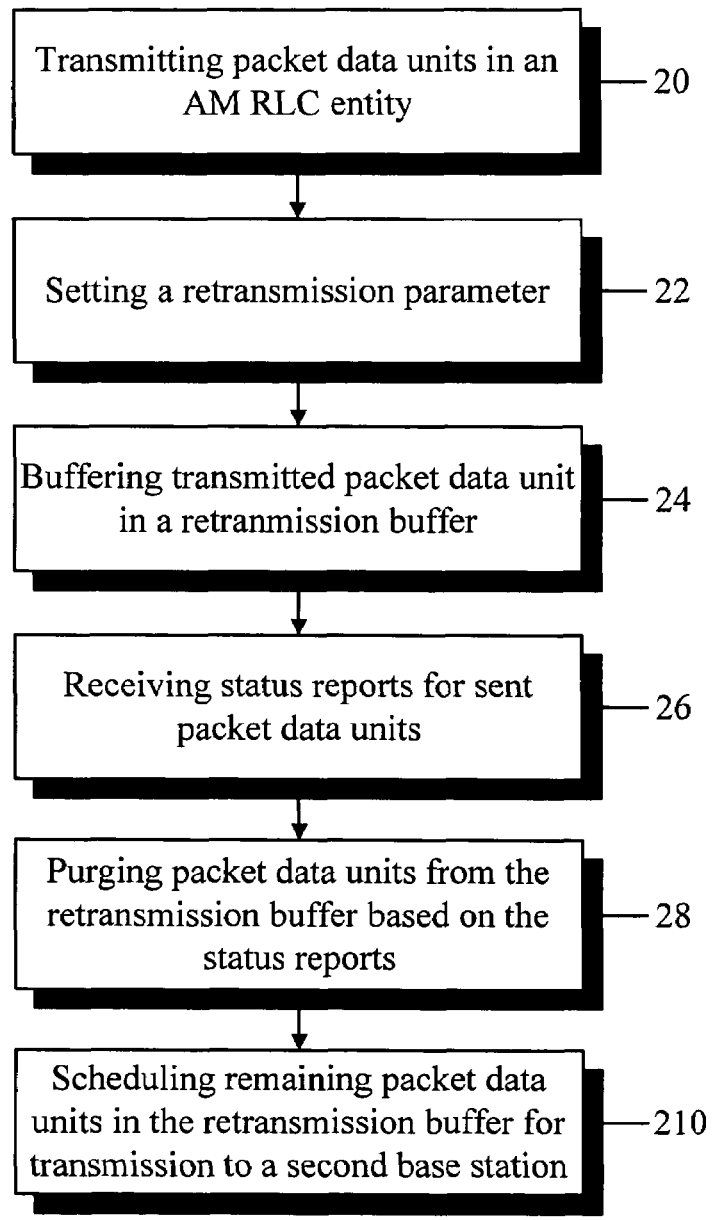
Fig. 2

METHOD, SYSTEM AND TRANSMITTING SIDE PROTOCOL ENTITY FOR SENDING PACKET DATA UNITS FOR UNACKNOWLEDGED MODE SERVICES

BACKGROUND OF THE INVENTION

1. Field of the Invention

The present invention relates to mobile telecommunication systems. In particular, the present invention relates to a novel and improved method, system and protocol entity for sending packet data units for unacknowledged mode services.

2. Description of the Related Art

In wireless data communications base stations are used to transmit data to mobile terminals. Mobile terminals can be in connection with one or more base stations at a time. In other words, cells of base stations may overlap, i.e. in some point a mobile terminal may be within two or more cells of different base stations. Every base station is able to serve mobile stations within a certain range. If a mobile terminal drifts out of the range of a base station, service is not available any more. Therefore, a handover to a new base station is needed. Normally, mobile telecommunication networks consist of several cells constituting a larger service area.

Most mobile telecommunication systems comprise a feature called as a 'handover'. A handover procedure means that an already established connection (e.g. a call, real-time data connection, non real-time data connection etc.) to a mobile terminal is maintained while moving from a cell to cell within a mobile telecommunication network. Examples of mobile communication networks include Wideband Code Division Multiple Access (WCDMA), Global System for Mobile communications (GSM), Internet Protocol Radio Access Network (IP RAN), Wireless Local Area Network (WLAN), etc.

In general, handovers are divided into two categories: a hard handover and a soft handover. A hard handover means that all the old radio links in the user equipment are removed before new radio links are established. A soft handover means that the radio links are added and removed in a way that the user equipment always keeps at least one radio link to a radio access network. A soft handover is performed by means of macro diversity, which refers to the condition that several radio links are active at the same time. Normally a soft handover can be used when cells operated on the same frequency are changed.

The handover procedure for data connections can be problematic. In a WCDMA network with the High Speed Downlink Packet Access (HSDPA), packet scheduling is done in a Node B. A buffer with user data is located in Node Bs on top of the Radio Link Control (RLC) buffer with user data in a Radio Network Controller (RNC). The data flow between these two buffers is regulated by flow control. The handover decision is taken in the RNC. When a handover between cells belonging to a different Node B is triggered, the RNC has to know the starting point of the data transmission to the new Node B.

The handover situation is problematic e.g. in the HSDPA. One of the key features of the HSDPA, the Packet Scheduler, is located in a Node B with the purpose of using recent channel quality information when scheduling users in a cell. That implies that user data is transferred from a radio network controller to the Node B, and queued in the Node B waiting to be transmitted from the Node B to user equipment. In the case of some services, e.g. streaming services, the amount of data stored in the Node B may be significant, and can easily reach values up to 20-30 Kbytes or even larger. Under the specifications of the 3GPP, the radio network controller is able to acquire information about the status of the data transferred through the Iub interface when acknowledged mode transmission is used, i.e. whether data have been successfully received by the user equipment or if data is still stored in the Node B. However, when unacknowledged mode transmission is used, the radio network controller does not have the status of the data transferred through the Iub interface.

On the other hand, the HSDPA does not support a soft handover. So, the handover can be done in e.g. two ways: 1) a HS-DSCH (High Speed Downlink Shared Channel) hard handover, 2) via mapping the bearer into a dedicated channel (DCH), and activating a soft handover in the cell edge area, and then return the bearer mapping into the HS-DSCH as soon as the user equipment enters the HSDPA cell coverage area (as shown in FIG. 1).

For services using unacknowledged mode in both handover options, the radio network controller faces the difficulty of not having information of which data packets have been successfully transmitted to the user equipment or are still stored in the Node B. Thus, when the process of a handover takes place, the radio network controller cannot identify which packets of the data flow have already been transmitted from the initial Node B to the user equipment, and which packets of the data flow should be transmitted from the new Node B to the user equipment.

SUMMARY OF THE INVENTION

The invention relates to sending packet data units for unacknowledged mode services in a handover between base stations in a mobile communications network. Especially, in the invention the Radio Link Control Acknowledged Mode is applied for data services that typically would run on the Radio Link Control Unacknowledged Mode.

According to one aspect of the invention, there is provided a method of sending packet data units for unacknowledged mode services in a handover between base stations in a mobile communications network, the network comprising at least a network node connected to at least a fist base station and a second base station and user equipment connected to at least one of the first and second base stations, the method comprising transmitting packet data units in an acknowledged mode Radio Link Control entity between a transmitting side and a receiving side; setting a retransmission parameter so that packet data units are not retransmitted when receiving status reports for sent packet data units from the receiving side; buffering transmitted packet data units in a retransmission buffer; receiving status reports for sent packet data units from the receiving side; purging packet data units from the retransmission buffer based on the received status reports; scheduling remaining packet data units in the retransmission buffer for transmission to the second base station; and transmitting the scheduled packet data units to the second base station.

In one embodiment of the invention, the step of purging comprises purging packet data units that have been negatively or positively acknowledged by the user terminal from the retransmission buffer.

In one embodiment of the invention, the retransmission parameter is the MaxDAT with a value of 2. In other embodiments other appropriate values may be used.

In one embodiment of the invention, the mobile communication network is a High Speed Downlink Packet Access network.

According to another aspect of the invention, there is provided a system of sending packet data units for unacknowledged mode services in a handover between base stations in a mobile communications network, wherein the system comprises at least one network node connected to at least a fist base station and a second base station; user equipment connected to at least one of the first and second base stations; a transmitter configured to transmit packet data units in an acknowledged mode Radio Link Control entity between a transmitting side and a receiving side; a retransmission buffer for buffering transmitted packet data units; setting means for setting a retransmission parameter so that packet data units are not retransmitted when receiving status reports for sent packet data units from the receiving side; a receiver configured to receive status reports for sent packet data units from the receiving side; a management unit configured to purge packet data units from the retransmission buffer based on the received status reports and to schedule remaining packet data units in the retransmission buffer for transmission to the second base station; wherein the transmitter is configured to transmit the scheduled packet data units to the second base station.

In one embodiment of the invention, the management unit is configured to purge packet data units that have been negatively or positively acknowledged by the user terminal from the retransmission buffer.

In one embodiment of the invention, the retransmission parameter is the MaxDAT with a value of 2. In other embodiments other appropriate values may be used.

In one embodiment of the invention, the mobile communication network is a High Speed Downlink Packet Access network.

According to another aspect of the invention, there is provided an acknowledged mode transmitting side protocol entity for sending packet data units for unacknowledged mode services in a handover between base stations in a mobile communications network. The entity comprises a transmitter configured to transmit packet data units in an acknowledged mode Radio Link Control entity between a transmitting side and a receiving side; a retransmission buffer for buffering transmitted packet data units; setting means for setting a retransmission parameter so that packet data units are not retransmitted when receiving status reports for sent packet data units from the receiving side; a receiver configured to receive status reports for sent packet data units from the receiving side; a management unit configured to purge packet data units from the retransmission buffer based on the received status reports and to schedule remaining packet data units in the retransmission buffer for transmission to the second base station; wherein the transmitter is configured to transmit the scheduled packet data units to the second base station.

In one embodiment of the invention, the management unit is configured to purge packet data units that have been negatively or positively acknowledged by the user terminal from the retransmission buffer.

In one embodiment of the invention, the retransmission parameter is the MaxDAT with a value of 2. In other embodiments other appropriate values may be used.

In one embodiment of the invention, the mobile communication network is a High Speed Downlink Packet Access network.

The present invention has several advantages over the prior-art solutions. The users of streaming services experience less transmission disruptions during a handover procedure. At the same time, unnecessary packet data unit retransmissions to the old base station, e.g. Node B, are avoided by using a special configuration of the acknowledged mode RLC.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

(PRIOR ART) FIG. 1 illustrates an exemplary situation in a handover in a High Speed Downlink Packet Access network;

FIG. 2 is block diagram illustrating an embodiment of a method according to the invention;

DETAILED DESCRIPTION OF THE PREFERRED EMBODIMENTS

Reference will now be made in detail to the embodiments of the present invention, examples of which are illustrated in the accompanying drawings.

Figure 3:
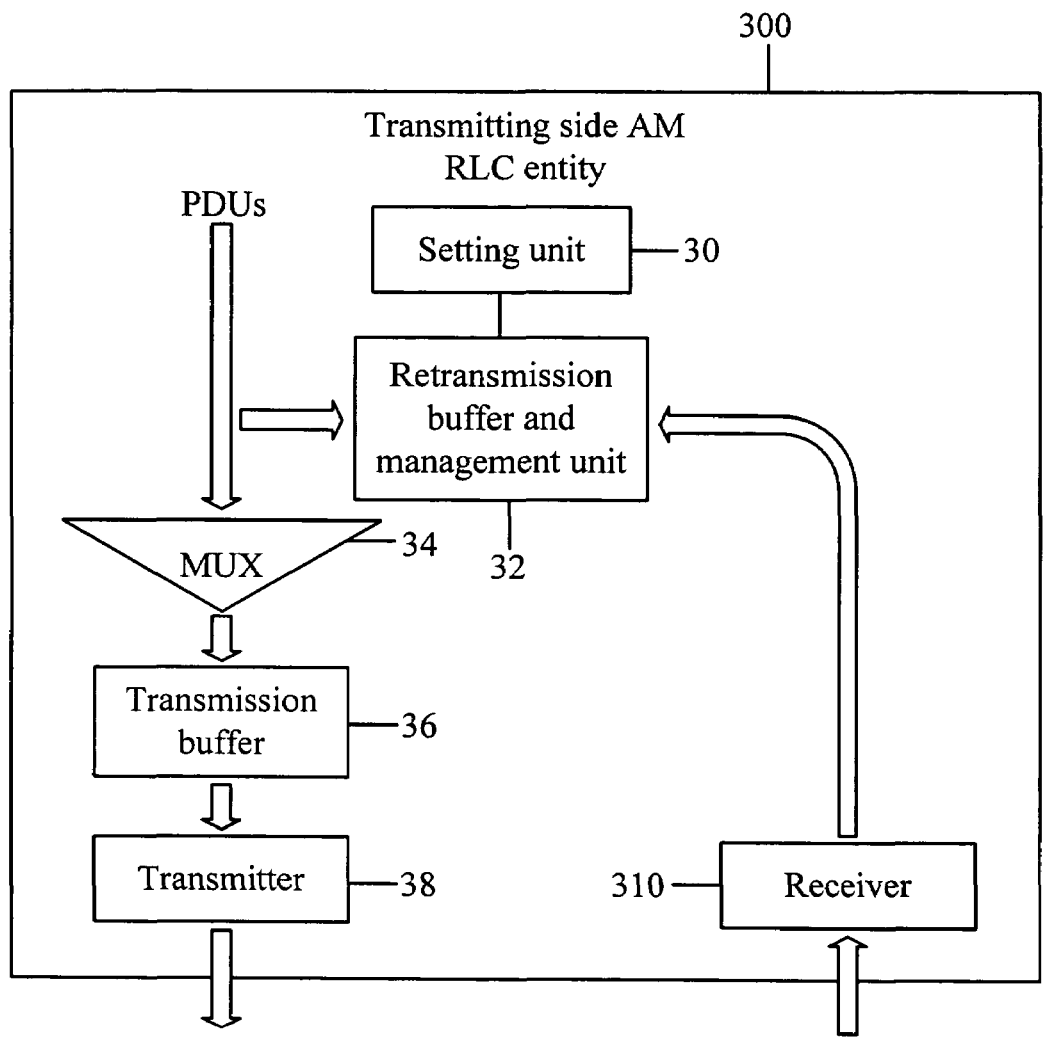
FIG. 3 is a block diagram illustrating an embodiment of the transmitting side AM RLC entity according to the invention.

FIG. 2 represents an embodiment of the method according to the invention. FIG. 3 illustrates an embodiment of the transmitting side AM RLC entity in accordance with the invention. In the following the invention is illustrated with reference to both figures. It must be noted that an AM RLC entity 300 of FIG. 3 may include also other components not shown in FIG. 3.

AM RLC entity 300 is an entity that transmits packet data units (PDU) to a receiving side AM RLC entity. 'AM' refers to acknowledged mode. Basically an AM RLC entity consists of a transmitting side, and a receiving side, wherein the transmitting side of the AM RLC entity transmits RLC PDUs and the receiving side of the AM RLC entity receives RLC PDUs. For simplicity, the receiving side is not illustrated in FIG. 3.

The transmitting side of the AM RLC entity receives RLC service data units (SDU) from upper layers through the AM service access point (SAP). The RLC SDUs are segmented and/or concatenated into acknowledged mode data (AMD) PDUs of a fixed length. The segmentation is performed if thereceived RLC SDU is larger than the length of available space in the AMD PDU. The AMD PDU size is a semi-static value that is configured by upper layers and can only be changed through re-establishment of the AM RLC entity by upper layers. The AMD PDU may contain segmented and/or concatenated RLC SDUs. The AMD PDU may also contain Padding to ensure that it is of a valid size. Length Indicators are used to define boundaries between RLC SDUs within AMD PDUs. Length Indicators are also used to define whether Padding or Piggybacked STATUS PDU is included in the AMD PDU.

After the segmentation and/or concatenation are performed, the AMD PDUs are placed in a Retransmission buffer 32 and at a multiplexer 34. AMD PDUs buffered in the Retransmission buffer are deleted or retransmitted based on a status report found within a status PDU or Piggybacked status PDU sent by the peer AM RLC entity. This status report may contain positive or negative acknowledgements of individual AMD PDUs received by the peer AM RLC entity. The multiplexer 34 multiplexes AMD PDUs from the Retransmission buffer 32 that need to be retransmitted, and the newly delivered from the Segmentation/Concatenation function.

The PDUs are then delivered to a function that completes the AMD PDU header from a transmission buffer 36 and potentially replaces padding with piggybacked status information. A Piggybacked status PDUs can be of variable size in order to match the amount of free space in the AMID PDU. The AMD PDU header is completed based on the input from the RLC Control Unit that indicates the values to set in various fields (e.g. Polling Bit). The function also multiplexes, if required, Control PDUs received from the RLC Control Unit (reset and reset ACK PDUs), and from the Reception buffer (Piggybacked status and status PDUs), with AMD PDUs.

The ciphering (if configured) is then applied to the AMD PDUs. The AMD PDU header is not ciphered. Piggybacked status PDU and Padding in AMD PDU (when present) are ciphered. Control PDUs (i.e. status PDU, reset PDU, and reset ACK PDU) are not ciphered. The transmitting side of the AM RLC entity (transmitter 38) then submits AMD PDUs to the lower layer through either one or two dedicated control channels (DCCH) or dedicated traffic logical channels (DTCH).

The above is a general description of transmitting packet data units in an AM RLC entity, as indicated at step 20.

At step 22, a retransmission parameter is set. The retransmission parameter is e.g. the MaxDAT parameter. MaxDAT is the maximum number of transmissions of an AMD PDU. MaxDAT parameter represents the upper limit for state variable VT(DAT). In one embodiment, MaxDat is set to 2. When a PDU is scheduled for transmission, VT(DAT) parameter is increased. Before transmission VT(DAT) is compared with MaxDAT, and if VT(DAT)=MaxDAT, the PDU is not transmitted. Therefore, when MaxDAT=2 the PDU is sent once but retransmissions of the PDU via the same base station are prevented. Therefore, the transmitting side AM RLC entity includes a setting unit 30 for setting the MaxDAT to a desired value. In other embodiments also other appropriate values for MaxDAT may be used.

When PDUs are scheduled for transmission, they are also buffered in the retransmission buffer 32, as indicated at step 24.

The receiving side sends status reports for sent PDUs transmitted from the transmitting side, as indicated at step 26. Status reports (negative and positive acknowledgements of packet data units by a user equipment) indicate whether sent PDUs have been received with the user equipment properly or not. For simplicity, FIG. 3 comprises a receiver 310 that is used to refer to one or more actual entities delivering status reports to the retransmission buffer and management unit 32.

In a handover situation it would, however, be desirable that PDUs that have not been acknowledged by the user equipment are not retransmitted from the retransmission buffer 32. When MaxDAT is set to 2, this prevents unnecessary retransmissions of PDUs via the old Node B to the user equipment. On the other hand, the user equipment should receive the PDUs that has not yet been acknowledged (i.e. packet data units that are buffered e.g. in the Node B) via the new Node B after handover from the old Node B. Therefore, based on the received status reports (negative and positive accknowledgements of packet data units by a user equipment) all the PDUs that have been acknowledged by the user equipment can be purged from the retransmission buffer 32 since no further retransmission is required, as indicated at step 28.

Thus, in a handover the transmitting side AM RLC entity schedules for transmission to the new Node B all the PDUs kept in the retransmission buffer 32, and the PDUs are resent to the new Node B, as indicated at step 210. In one embodiment, the VT(DAT) parameter of a PDU is not compared to the MaxDAT value when the PDU is sent to the new Node B.

As a summary, FIGS. 2 and 3 illustrate an embodiment of the invention in which a retransmission parameter (e.g. Max-DAT) is set to a desired value in order to prevent retransmission of PDUs in a handover situation. The transmitting side AM RLC entity purges from the retransmission buffer (based on status reports from a user equipment) PDUs that have been acknowledged. A status report includes e.g. the sequence number of the highest PDU expected by the user equipment, and therefore the status report indicates the sequence number of the RLC PDUs that have been received at the user equipment (either correctly or incorrectly). All the remaining PDUs in the retransmission buffer are scheduled for transmission and transmitted to the new Node B.

Figure 4:
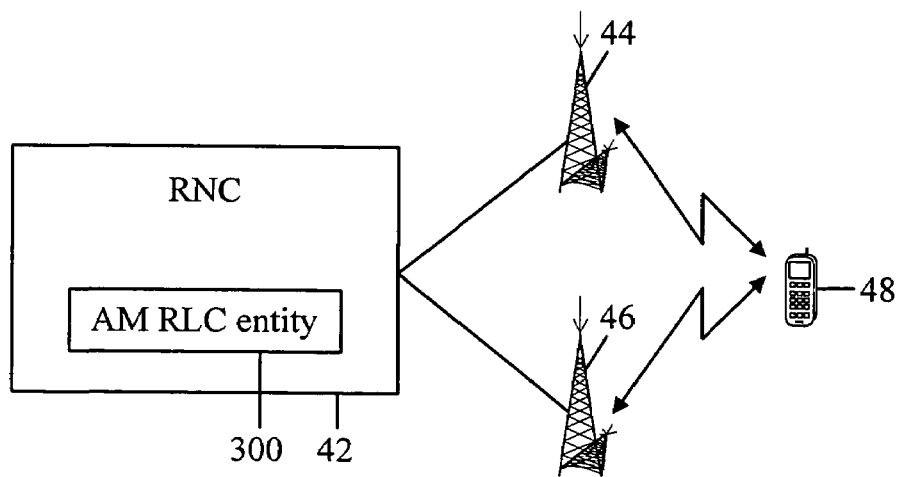
FIG. 4 is block diagram illustrating an embodiment of a system according to the invention.

FIG. 4 illustrates an embodiment of a system according to the invention. FIG. 4 is a simplified example of a possible mobile communication network in which the invention can be used. The network elements disclosed in FIG. 4 belong e.g. to a WCDMA network with the High Speed Downlink Packet Access (HSDPA).

FIG. 4 includes a radio network controller 42, two Node Bs (base stations) 44, 46 and a user equipment 48, which is e.g. a mobile phone. Radio network controller 42 includes an AM RLC entity 300, which was described in detail above.

Based on the above description, it is evident that the solution disclosed in the invention may be used in other mobile comminication networks other than a High Speed Downlink Packet Access network.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method, comprising:
    transmitting packet data units for unacknowledged mode services in a handover between base stations in a mobile communications network in an acknowledged mode radio link control entity between a transmitting side and a receiving side;
    setting a retransmission parameter so that the packet data units are not retransmitted to a first base station when receiving positive or negative status reports for the packet data units from said receiving side;
    buffering the packet data units in a retransmission buffer;
    receiving status reports for the packet data units from said receiving side;
    purging from said retransmission buffer all the packet data units for which positive or negative status reports have been received;
    scheduling remaining packet data units in said retransmission buffer for transmission to a second base station; and
    transmitting said scheduled remaining packet data units to said second base station.

2. The method according to claim 1, wherein said setting comprises setting said retransmission parameter that comprises a MaxDAT with an appropriate value.

3. The method according to claim 1, wherein said transmitting comprises transmitting the packet data units in a mobile communication network, which is a high speed downlink packet access network.

4. A system, comprising: a network node connected at least to a first base station and a second base station; user equipment connected to at least one of said first or said second base stations; a transmitter configured to transmit packet data units for unacknowledged mode services in a handover between base stations in a mobile communications network in an acknowledged mode radio link control entity between a transmitting side and a receiving side;

a retransmission buffer configured to buffer the packet data units;

a setting device configured to set a retransmission parameter so that the packet data units are not retransmitted to said first base station when receiving positive or negative status reports for the packet data units from said receiving side;

a receiver configured to receive the status reports for the packet data units from said receiving side; and a management device configured to purge from said retransmission buffer all the packet data units for which positive or negative status reports have been received and to schedule remaining packet data units in said retransmission buffer for transmission to said second base station, wherein said transmitter is configured to transmit said scheduled packet data units to said second base station.

5. The system according to claim 4, wherein said retransmission parameter comprises a MaxDAT with an appropriate value.

6. The system according to claim 4, wherein the transmitter is further configured to transmit said packet data units in a mobile communications network, said mobile communication network comprising a high speed downlink packet access network.

7. An apparatus, comprising: a transmitter configured to transmit packet data units for unacknowledged mode services in a handover between base stations in a mobile communications network in an acknowledged mode radio link control entity between a transmitting side and a receiving side;

a retransmission buffer configured to buffer the packet data units;

a setting device configured to set a retransmission parameter so that the packet data units are not retransmitted to said first base station when receiving positive or negative status reports for the packet data units from said receiving side;

a receiver configured to receive the status reports for the packet data units from said receiving side; and a management device configured to purge from said retransmission buffer all the packet data units for which positive or negative status reports have been received and to schedule remaining packet data units in said retransmission buffer for transmission to said second base station, wherein said transmitter is configured to transmit said scheduled packet data units to said second base station.

8. The apparatus according to claim 7, wherein said retransmission parameter comprises a MaxDAT with an appropriate value.

9. The apparatus according to claim 7, wherein the transmitter is further configured to transmit said packet data units in a mobile communication network, said mobile communication network comprising a high speed downlink packet access network.

10. An apparatus, comprising:

transmitting means for transmitting packet data units for unacknowledged mode services in a handover between base stations in a mobile communications network in an acknowledged mode radio link control entity between a transmitting side and a receiving side;

setting means for setting a retransmission parameter so that the packet data units are not retransmitted to said first base station when receiving positive or negative status reports for the packet data units from said receiving side;

buffering means for buffering the packet data units in a retransmission buffer;

receiving means for receiving status reports for the packet data units from said receiving side;

purging means for purging from said retransmission buffer all the packet data units for which positive or negative status reports have been received;

scheduling means for scheduling remaining packet data units and said retransmission buffer for transmission to said second base station; and transmitting means for transmitting said scheduled remaining packet data units to said second base station.

* * * * *